United States Patent [19]

Palû

[11] Patent Number: 4,856,137
[45] Date of Patent: Aug. 15, 1989

[54] WINDSCREEN WIPER ARM OF IMPROVED TYPE

[75] Inventor: Attilio D. Palû, Rivoli, Italy

[73] Assignee: Fister S.p.A, Turin, Italy

[21] Appl. No.: 28,255

[22] Filed: Mar. 20, 1987

[30] Foreign Application Priority Data

Apr. 2, 1986 [IT] Italy ............................ 53218/86[U]

[51] Int. Cl.⁴ ............................ B60S 1/34; E05D 7/10
[52] U.S. Cl. ..............................: 15/250.31; 15/250.35; 16/267; 403/163
[58] Field of Search .......... 15/250.35, 250.34, 250.31, 15/250.32, 250.33; 16/260, 267; 403/79, 157, 163, 161, 150, 152

[56] References Cited

U.S. PATENT DOCUMENTS

| | | | |
|---|---|---|---|
| 1,496,466 | 6/1924 | Jackson | 16/260 |
| 2,404,523 | 7/1946 | Nesson | 403/157 X |
| 2,531,889 | 6/1944 | Oishei | 15/250.35 |
| 2,860,364 | 11/1958 | Krohm | 15/250.34 |
| 2,980,453 | 4/1961 | Nesson | 15/250.34 X |
| 3,416,185 | 12/1968 | Peterson | 16/267 |
| 4,170,804 | 10/1979 | Scotcher | 15/250.34 |
| 4,615,067 | 10/1986 | Beneteau | 15/250.35 |

FOREIGN PATENT DOCUMENTS

| | | | |
|---|---|---|---|
| 3502715 | 9/1986 | Fed. Rep. of Germany | 15/250.35 |
| 2069325 | 8/1981 | United Kingdom | 15/250.35 |

Primary Examiner—Harvey C. Hornsby
Assistant Examiner—Scott J. Haugland
Attorney, Agent, or Firm—Gifford, Groh, Sheridan, Sprinkle and Dolgorukov

[57] ABSTRACT

A windscreen wiper arm of improved type is described, comprising a block carried for rotation by a drive shaft and supporting, with an articulated attachment, an arm element in turn supporting a blade, and in which this arm element is made in plastics material.

5 Claims, 2 Drawing Sheets

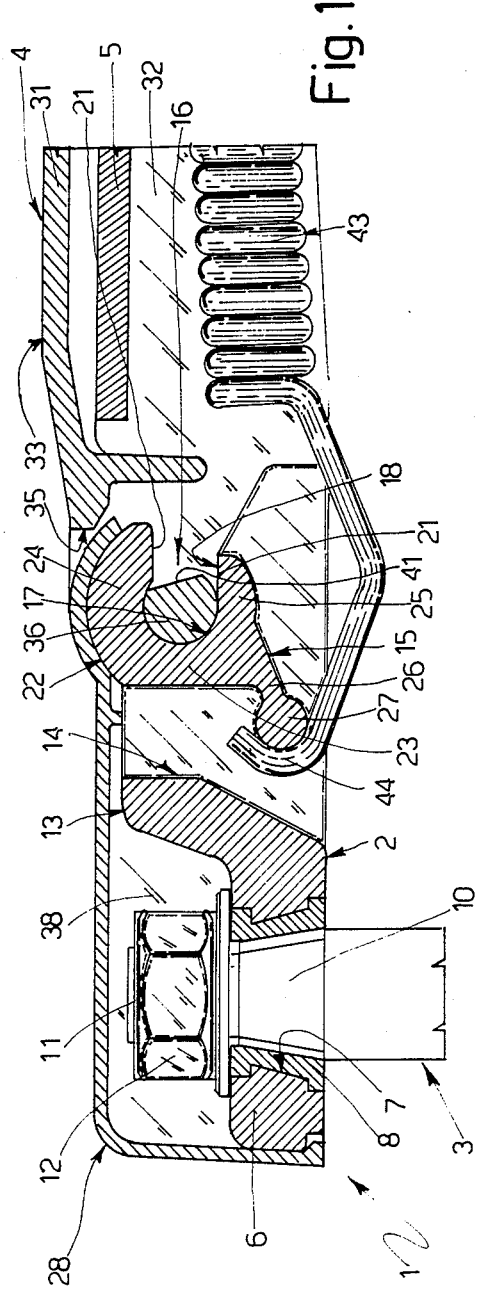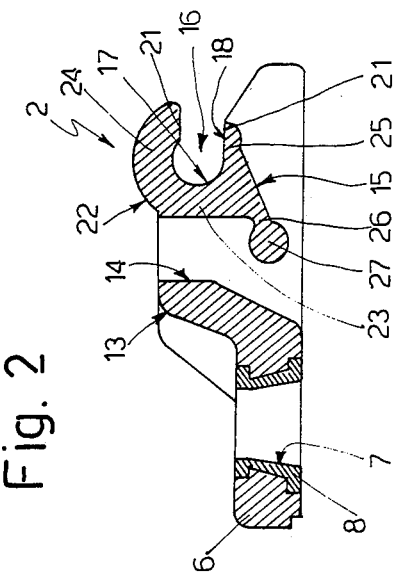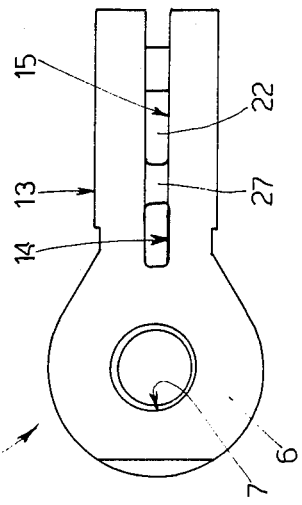

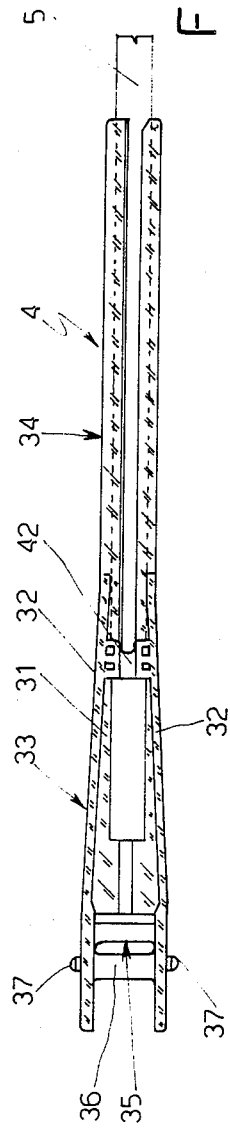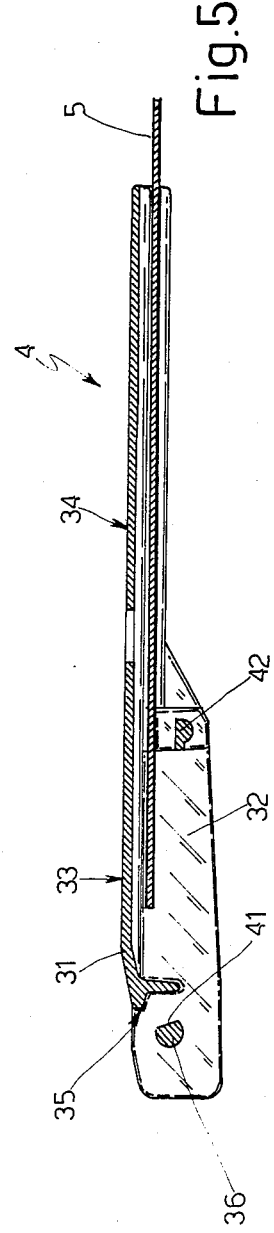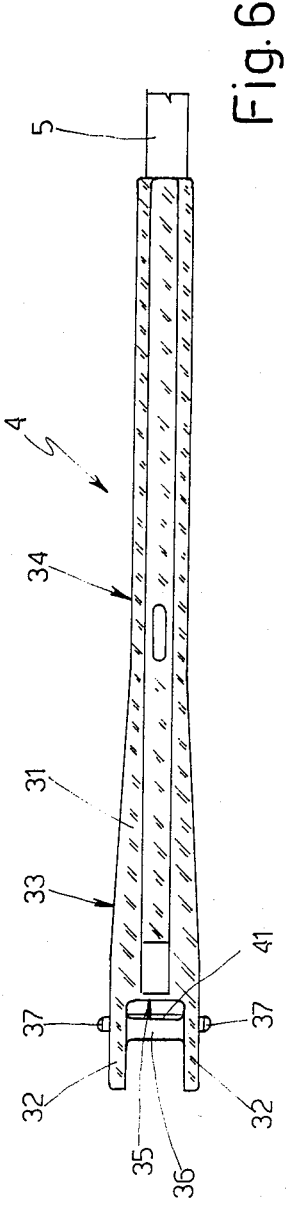

WINDSCREEN WIPER ARM OF IMPROVED TYPE

BACKGROUND OF THE INVENTION

The present invention relates to a windscreen wiper arm of improved type.

As is known, windscreen wiper arms currently on the market include a block one point of which is fixed for rotation with a drive spindle and the opposite part of which supports an arm element which, in turn, carries a windscreen wiper blade by means of a rod. This arm element is articulated to the block in order to be able to follow the variations of curvature of the windscreen and to enable it to be raised, for example during cleaning of the windscreen.

Windscreen wipers as just described have various disadvantages. In particular, the arm element and the block are metallic, which involves an additional cost for painting and a further cost for riveting an articulation pin fitted between the two elements.

SUMMARY OF THE INVENTION

The object of the present invention is that of providing a windscreen wiper arm of improved type which will be free from the stated disadvantages and which will thus be of reduced production cost together with other additional advantages which will be described in detail.

According to the present invention there is provided a windscreen wiper arm of improved type comprising a block fixable for rotation with a drive shaft and supporting, with an articulated attachment, an arm element in turn supporting a wiper blade, characterised by the fact that the said arm element is made of plastics material.

BRIEF DESCRIPTION OF THE DRAWINGS

For a better understanding of the present invention a preferred embodiment is now described, by way of non-limitative example, with reference to the attached drawings, in which:

FIG. 1 is a partial sectional view of a windscreen wiper arm according to the present invention;

FIG. 2 is a section on a reduced scale of a first detail of the windscreen wiper arm of FIG. 1;

FIG. 3 is a view from below looking upwards of the detail of FIG. 2; and

FIGS. 4, 5 and 6 are a view from below looking upwards, a sectional view, and a plan view respectively of a second detail of the arm of FIG. 1.

DETAILED DESCRIPTION OF THE INVENTION

As illustrated in FIG. 1, a windscreen wiper arm generally indicated 1, comprises a block 2 of plastics material which can be fixed for rotation to a shaft 3 driven, via a mechanism not illustrated, by a small motor. The block 2 further supports a plastics material element 4, by way of an articulated attachment, which element 4 in turn supports, in a known way, a windscreen wiper blade, not illustrated for simplicity, by means of a metal rod 5.

With reference to FIGS. 1, 2 and 3, the block 2 includes a cylindrical portion 6 along the axis of which is formed a frustoconical through hole 7 which is engaged, with the interposition of a frustoconical bush 8, by a section 10, also frustoconical, of the shaft 3. This latter has a threaded end 11 which extends upwardly beyond the hole 7 and on which is screwed a nut 12 which secures the shaft 3 and the block 2 together. From a side zone of the portion 6 extends a second, substantially prismatic portion 13 of greater height having a longitudinal axis orthogonal to the axis of the hole 7. In the portion 13 is formed, from above downwardly, a through slot 14, and longitudinally a slit 15 which is open at the front and bottom. At the free end of the portion 13 is formed a small notch 16 open at the front and having an internal section 17 having a semi-cylindrical outline and an outwardly open section 18 delimited above and below by flat faces 21. The formation of the slot 14, the slit 15 and the notch 16 defines a U-shape element 22 having a central part 23 which separates the upper zone of the slot 14 from the notch 16, and two arms 24 and 25, respectively upper and lower arms, which delimit the notch 16. The lower arm 25 separates the front zone of the slit 15 from the notch 16. At the free ends of the arms 24 and 25 there are formed flat faces 21 facing one another. Obliquely downwardly from the corner defined by the central part 23 and the lower arm 25 extends a projection 26 having a hemispherical head 27. The projection 26 separates the lower zone of the slot 14 from the rear zone of the slit 15. The windscreen wiper arm 1 further includes a cap 28 of plastics material which covers the block 2.

As illustrated in FIGS. 1, 4, 5 and 6, the element 4 is of inverted substantially U-shape and thus presents an upper wall 31 and two side walls 32. This element 4 has two coaxial portions 33 and 34, the portion 33 of which is supported by the block 2 and the portion 34 of which carries the rod fixed thereto. The walls 31 and 32 of the portion 33 are of greater width than the walls 31 and 32 of the portion 34. At the free end of the portion 33 on its wall 31 is formed an open slot 35 and in correspondence with this the walls 32 form an integral transverse pin 36 the ends 37 of which extend beyond the walls 32. Side walls 38 of the cap 28 are pivoted in a manner not illustrated on these ends 37. The pin 36, has, along the whole if its longitudinal extent, within the walls 32, a flat face 41 facing obliquely upwardly and towards the portion 34. Close to the connection with the portion 34, the walls 32 of the portion 33 support a fixed pin 42 on which is hooked a first end of a tension spring 43 a second end 44 of which extends into the block 2 along the slit 15 to be hooked onto the head 27 of the projection 26.

As illustrated in FIG. 1, the articulated attachment between the block 2 and the element 4 is achieved by the housing of the pin 36 in the section 17 of the notch 16, having substantially the same diameter, and in the connection between the two by means of the spring 43. To disengage the element 4 from the block 2 it is sufficient to rotate the element 4 in an anti-clockwise sense about the axis of the pin 36 in such a way as to make the flat face 41 of the pin 36 come into juxtaposition with the flat face 21 of the arm 24. Upon reaching this position it is possible to extract the pin 36 from the notch 16. Naturally the distance between the faces 21 of the arms 24 and 25 is slightly greater than the size of the pin 36 measured perpendicularly to its flat face 41. Moreover, it is evident that before extraction it is necessary to release the spring 43 either from the block 2 or from the element 4.

In use, the shaft 3 rotates alternately in a clockwise and in an anti-clockwise sense carrying the block 2 into rotation also, which in turn draws the element 4 into rotation and by means of the rod 5 moves the wiper blade. The assembly of the element 4 on the block 2 occurs with the reverse operations from those described in relation to the removal of the element 4. When the block 2, and more precisely its portion 13 and the element 4 are aligned with one another (during normal use) it is not possible to disengage the element 4 in that the pin 36 engages the semi-cylindrical section 17 of the notch 16 and because of its dimensions cannot pass out through the section 18. From what has been described the advantages achieved by the present invention are evident.

In particular, the main advantage lies in the fact that the block 2 and the element 4 are both made of plastics material at a lower cost than those of metal. Moreover, the cost is further reduced by the fact that the articulated attachment between the block 2 and the element 4 is also made of plastics material with the pin 36 which is formed integrally with the element 4. This avoids all the fixing operations by means of riveting of the pin which are effected on metal arms of windscreen wipers currently on the market. It is to be underlined, also, that the use of plastics material for the element 4 allows this element to be made in a predetermined colour without any need for painting operations which have a certain cost. Finally, the use of plastics material for the block 2 and the element 4 also allows, with respect to their manufacture in metal, a weight reduction even greater than 50%, and this, as well as the advantages in general terms of weight reduction of the component element of the vehicle, also allows a reduction in the inertia of the windscreen wiper arm at the end points where the movement changes direction, in this way the wiping frequency of the arm can be increased with a greater efficacy of the wiping action.

Finally, it is clear that the windscreen wiper arm 1 described and illustrated here can have modifications and variations introduced thereto without by this departing from the protective scope of the present invention. In particular, the attachment between the block 2 and the shaft 3 can be different from that described and, for example, can be of the ribbed type or one having transverse fixing screws. With this a block 2 of interchangeable type is formed and, that is to say a block 2 adapted to the shape of the shaft 3 can be chosen.

I claim:

1. An improved windscreen wiper arm adapted to carry a wiper blade thereon and adapted for attachment to a drive shaft (3) of a wiper motor, comprising:
    a U-shaped, plastic material arm element (4) adapted to support said wiper blade and comprising two side walls (32);
    a block (2) fixable for rotation with said drive shaft (3), said block (2) including a first portion (13) having a notch (16) formed therein; and
    articulated means for attaching and supporting said element (4) on said block (2) including a fixed pin (36) located close to one end of said element (4), said pin (36) being integrally formed with and connecting said side walls (32);
    wherein said fixed pin (36) has at least one flat side (41) extending longitudinally of the pin and is dimensioned to permit removeable engagement of said pin (36) in said notch (16) upon rotation of said element (4) about a longitudinal axis of said pin (36), thereby allowing removeable securement of said element (4) and said wiper blade to said block (2).

2. A windscreen wiper arm according to claim 1, characterised by the fact that the said block (2) is made of plastics material.

3. A windscreen wiper arm according to claim 1, characterized by the fact that said pin (36) is substantially semi-cylindrical with said flat face (41) facing the interior of said arm (4), and by the fact that said notch (16) has an inner section (17) of semi-cylindrical outline of diameter substantially equal to that of said pin (36) and an outwardly open section (18) having a pair of opposed flat faces (21) the separation between which is less than the diameter of said pin (36) and slightly greater than the dimension of said pin (36) measured perpendicularly to said flat face (41), said pin (36) being lodged in said inner section (17) of said notch (16).

4. A windscreen wiper arm according to claim 3, characterised by the fact that the said block (2) and the said element (4) have respective hook means (27), (42) for a tension spring (43).

5. A windscreen wiper arm according to claim 3 characterised by the fact that it includes a cap (28) of plastics material which covers said block (2) the cap including a pair of side walls (38) located outside said side walls (32) of said element (4), said sidewalls (38) pivotably engaging ends (37) of said pin (36).

* * * * *